(12) United States Patent
Jensrud et al.

(10) Patent No.: US 9,662,749 B2
(45) Date of Patent: May 30, 2017

(54) METHOD FOR PRODUCTION OF ALLOYED TITANIUM WELDING WIRE

(75) Inventors: Ola Jensrud, Raufoss (NO); Arne Kolbu, Gjovik (NO); Sverre Gulbrandsen-Dahl, Disena (NO); Kevin Dring, Porsgrunn (NO)

(73) Assignee: NORSK TITANIUM AS, Hønefoss (NO)

( * ) Notice: Subject to any disclaimer, the term of this patent is extended or adjusted under 35 U.S.C. 154(b) by 675 days.

(21) Appl. No.: 14/006,412

(22) PCT Filed: Mar. 21, 2012

(86) PCT No.: PCT/IB2012/051346
§ 371 (c)(1),
(2), (4) Date: Nov. 4, 2013

(87) PCT Pub. No.: WO2012/127426
PCT Pub. Date: Sep. 27, 2012

(65) Prior Publication Data
US 2014/0056748 A1    Feb. 27, 2014

(30) Foreign Application Priority Data
Mar. 22, 2011   (GB) .................................. 1104764.4

(51) Int. Cl.
*B23K 35/32*   (2006.01)
*B23K 35/02*   (2006.01)
(Continued)

(52) U.S. Cl.
CPC ............ *B23K 35/325* (2013.01); *B21C 23/08* (2013.01); *B21C 23/32* (2013.01); *B21C 25/02* (2013.01);
(Continued)

(58) Field of Classification Search
CPC .... B23K 2998/10; B23K 5/12; B23K 35/325; C22F 1/02
(Continued)

(56) References Cited

U.S. PATENT DOCUMENTS 2,967,613 A   1/1961   Ellis et al.
3,052,976 A   9/1962   Rennhack
(Continued)

FOREIGN PATENT DOCUMENTS

CN   1639366      7/2005
CN   101223294    7/2008
(Continued)

OTHER PUBLICATIONS

International Search Report issued Aug. 1, 2012 in International Application No. PCT/IB2012/051346.
(Continued)

*Primary Examiner* — Weiping Zhu
(74) *Attorney, Agent, or Firm* — Dentons US LLP (57) ABSTRACT

A method for producing a weldable titanium alloy and/or composite wire. The method includes: a) forming a green object by blending particulates of titanium sponge with one or more powdered alloying additions and cold compacting the blended mixture and subjecting the blended mixture including lubricant to pressure; b) forming a work body of alloyed titanium by heating the green object in a protected atmosphere and holding the temperature for a period of at least 4 hours, and then hot working the green object at a temperature of less than 200° C. apart from the beta transition temperature of the titanium alloy and shaping the green object to obtain an elongated profile; and c) forming the welding wire by placing the elongated profile of the work body in a rolling mill having one or more rolls disposed in series.

10 Claims, 3 Drawing Sheets

(51) Int. Cl.

| | |
|---|---|
| *B23K 35/40* | (2006.01) |
| *C22C 14/00* | (2006.01) |
| *C22F 1/02* | (2006.01) |
| *C22F 1/18* | (2006.01) |
| *B22F 5/12* | (2006.01) |
| *C22C 1/03* | (2006.01) |
| *C22C 1/04* | (2006.01) |
| *B21C 23/08* | (2006.01) |
| *B21C 23/32* | (2006.01) |
| *B21C 25/02* | (2006.01) |
| *B22F 1/00* | (2006.01) |
| *B22F 3/02* | (2006.01) |
| *B22F 3/18* | (2006.01) |
| *B22F 3/20* | (2006.01) |

(52) U.S. Cl.
CPC ............. *B22F 1/0003* (2013.01); *B22F 3/02* (2013.01); *B22F 3/18* (2013.01); *B22F 3/20* (2013.01); *B22F 5/12* (2013.01); *B23K 35/0244* (2013.01); *B23K 35/0261* (2013.01); *B23K 35/40* (2013.01); *C22C 1/03* (2013.01); *C22C 1/045* (2013.01); *C22C 14/00* (2013.01); *C22F 1/02* (2013.01); *C22F 1/183* (2013.01); *B22F 2301/205* (2013.01); *B22F 2304/15* (2013.01); *B22F 2998/10* (2013.01)

(58) Field of Classification Search
USPC ....................................................... 219/145.1
See application file for complete search history.

(56) References Cited

U.S. PATENT DOCUMENTS

| | | | |
|---|---|---|---|
| 4,999,336 A * | 3/1991 | Nadkarni | ............. B22F 1/0003 505/124 |
| 6,582,833 B2 | 6/2003 | Toyoda et al. | |
| 6,635,098 B2 | 10/2003 | Abkowitz et al. | |
| 7,442,266 B2 | 10/2008 | Furuta et al. | |
| 8,394,168 B2 | 3/2013 | Withers et al. | |
| 2004/0115083 A1* | 6/2004 | Furuta | .................... C22C 14/00 419/28 |
| 2006/0185473 A1 | 8/2006 | Withers et al. | |
| 2009/0107249 A1 | 4/2009 | Schroeder et al. | |
| 2009/0107294 A1 | 4/2009 | Nishioka et al. | |
| 2012/0269671 A1 | 10/2012 | Dring | |

FOREIGN PATENT DOCUMENTS

| | | |
|---|---|---|
| EP | 1 375 690 | 1/2004 |
| GB | 2474706 | 3/2012 |
| JP | 60-033308 | 2/1985 |
| JP | 61-86094 | 5/1986 |
| JP | 63-262431 | 10/1988 |
| JP | 52-029407 | 3/1997 |
| JP | 2001131609 | 5/2001 |
| JP | 2008-528813 | 7/2008 |
| RU | 2090310 | 9/1997 |
| SU | 1038068 | 8/1983 |
| WO | 2007/084144 | 7/2007 |

OTHER PUBLICATIONS

Great Britain Search Report issued May 11, 2011 in corresponding Great Britain patent application No. 110464.4.
Written Opinion of the International Searching Authority issued Aug. 1, 2012 in International Application No. PCT/IB2012/051346.
Office Action issued Dec. 26, 2014 in corresponding Chinese patent application No. 2012800142694.
JPO; Preliminary Notice of Reasons for Rejection Issued in Related Japanese Patent Application No. 2014-500523; Mailed Dec. 22, 2015; 15 Pages including English Language Translation.

\* cited by examiner

METHOD FOR PRODUCTION OF ALLOYED TITANIUM WELDING WIRE

This invention relates to a method for producing a weldable titanium alloy and/or composite wire by cold compaction, extrusion and rolling of a blended mixture of titanium sponge and alloying additions and/or reinforcing particles whereby consolidation and forming is performed wholly in the solid state without melting or encapsulation of said mixture of titanium sponge and alloying additions and/or reinforcing particles.

INTRODUCTION

Titanium alloys and composites possess superior structural efficiencies owing to their high specific stiffness and strength. However, the present production process for making titanium alloys, whereby titanium sponge particles are blended with alloying additions, such as Al, V, Fe, $TiO_2$, Mo, and Zr, severely restricts the range of titanium alloys that are commercially feasible. This is due to the need for large cast ingots of titanium alloy, in order to achieve economies of scale, which, in turn, necessitates large amounts of molten titanium that experiences slow cooling, due to the low thermal conductivity of titanium, and consequently provides optimum conditions for segregation of alloying constituents and grain growth.

Alloying additions with a plurality of elements in a fixed ratio of elements, such as 60Al-40V, are called masteralloys. The fixed ratio simplifies blending and dissolution of the additions into the titanium, since these blends are melted by an electron beam, plasma torch, or under vacuum arc to produce large ingots up to 1.5 m in diameter and weighing up to 25 tonnes. This processing step is both capital intensive and, due to segregation during ingot solidification, elements such as B, Cu, Fe, Cr, Ni, Si and Mn and must be kept within strictly controlled limits, typically below 500 to 1200 ppm (Ref 1: ASTM B299 Standard Specification for Titanium Sponge). These elements all have partition coefficients (k) less than unity, except for Cr, which is a slow diffuser, and are rejected from the solidifying titanium into the surrounding liquid. Consequently, the liquid titanium is progressively enriched in these elements as solidification proceeds. At the conclusion of solidification, this accumulation leads to defects such as beta fleck and local compositions with significantly lower melting points (1085° C. for Ti—Fe, 942° C. for Ti—Ni) than the nominal ingot composition. To mitigate these extreme local variations, the ingots are held at high temperatures for long periods of time, such that diffusive mass transfer can homogenize the chemical composition.

The production of titanium composites is additionally complicated by the fact that many desirable reinforcing particles are either rapidly dissolved (e.g. carbon fibres, SiC, $Al_2O_3$) or coarsen (TiB) when immersed in molten titanium. The former leads to loss of the reinforcing particles, while the latter will be a failure initiation site under mechanical loading.

The beneficial properties imbued by the elements and reinforcing particles listed above, either alone or in combination, have not been realised, due to the processing complications inherent in ingot metallurgy that are described above. Such benefits include improved machinability, both increased and decreased Young's modulus and high temperature performance.

These conventional cast ingots are subsequently forged and rolled to refine the coarse, as-cast microstructure that results from grain growth during prolonged exposure at high temperatures and to reduce the cross-sectional area of the ingot and form intermediate products such as billets, bars and plate.

To produce conventional titanium alloy wire, the bar stock produced via the above manner is typically rolled to a diameter less than 10 mm and drawn to final size, which for automated welding applications is typically 1 to 3 mm. Taking into account yield losses during subsequent handling, the cost increase in converting Ti sponge and alloying additions to bar and subsequently a weldable alloy wire represents the majority of the total cost of wire production. The plurality of processing steps is accompanied by multiple manual handling operations and the production cost for titanium alloy weld wire renders its use as an additive manufacturing feedstock unattractive except for niche applications.

PRIOR ART

An alternate method of producing a weldable titanium alloy final product through solid state processing (without intermediate melting) of titanium sponge and alloying additions would address many of the shortcomings inherent in the conventional processing route and enable production of novel compositions that exhibit superior mechanical, thermal & corrosion properties.

It is known from US 2006/185473 that a low cost feed wire for a plasma transferred arc torch for building titanium objects by direct metal deposition may be produced by first combining and mixing primary Ti sponge material with Al and V powders or Al—V prealloyed powder at a mixing stage in a shear mixer. The Al—V powders or Al—V prealloyed powder is mixed and milled in mixer to a particle size preferably not exceeding about 5 mm. The mixed powder is then fed to a drawing stage comprising a series of rollers in which titanium sponge, which is quite ductile, and the alloying powders are squeezed together with sufficient force to produce an elongate body which, with multiple reductions achieves sufficient strength to be used as a wire feed for a direct metal deposition system. According to the document, the formation of Ti alloy wire by mixing and rolling is possible because of the inherent high ductility of pure Ti sponge. The ductility of the Ti sponge results in the Ti becoming essentially "self bonded" when squeezed through a series of reducing area rolls, and traps the alloying and ceramic powders.

EP 1 375 690 discloses a method of producing a high-strength titanium alloy by forming a raw material powder mixture containing from 15 to 30 atomic % Va group element, an interstitial element such as O, N, or C from 1.5 to 7 atomic % O, and titanium (Ti). The powder formulation may be formed by using sponge powders, hydrogenated-and-dehydrogenated powders, hydrogenated powders, atomized powders, and the like. The document teaches that dense sintered bodies can be obtained when the average particle diameter is 100 μm or less, preferably 45 μm or less. The raw material powder can be mixture powders in which elementary powders are mixed, or alloy powders which have desired compositions. The powder mixture is compacted, for instance, by using die forming, CIP compacting (cold isostatic press compacting), RIP compacting (rubber isostatic press compacting), and so on. The compacted bodies are subject to a sintering step, preferably in vacuum or in inert gas atmospheres. The sintering temperature range can be from 1200° C. to 1600° C., further from 1200° C. to 1500° C. It is preferred that the sintering time can be from 2 to 50 hours, further from 4 to 16 hours. Thereafter the sintered object is further compacted to reduce voids and the like in the sintered alloy. The hot working step can be carried out by hot forging, hot swaging, hot extruding, and so forth. The hot working step can be carried out in any atmospheres such as in air and in inert gas atmospheres. In view of controlling facilities, it is economical to carry it out in air. The hot working referred to in the present production process is carried out in order to compact sintered bodies, but can be carried out in combination with the forming while taking the shapes of products into consideration. The resulting titanium alloy exhibits a good cold working property, when it is subjected to cold working, the mechanical characteristics are improved. Hence, the present production process can preferably be provided with a cold working step in which cold working is carried out after said hot working step. The cold working step can be carried out by cold forging, cold swaging, wire drawing with dies, drawing, and the like. Moreover, the cold working can be carried out in combination with product forming. Specifically, titanium alloy obtained after the cold working can be formed as raw materials such as rolled stocks, forged stocks, plates, wires and rods, or can be formed as objective final shapes of products or shapes close thereto.

OBJECTIVE OF THE INVENTION

The main objective of the invention is to provide a cost effective method for producing titanium alloy or titanium composite wire feedstock.

A further objective of the invention is to provide a method for producing weldable titanium or alloyed titanium wire that, when melted and built into a component using additive manufacturing, exhibits a chemical composition and mechanical properties comparable to the chemical composition and mechanical properties demonstrated in components built up using conventional welding wire.

DESCRIPTION OF THE INVENTION

The present invention is based on the realisation that the a cost effective method for producing a weldable titanium alloy or composite wire produced from particulated titanium sponge and powdered alloying additions may be obtained by processing solely in the solid state without melting the titanium at any time during processing. By eliminating the liquid metal processing of titanium, alloys or composites containing constituents with greatly different melting points to titanium can be added, such as Mg, Al or W, Mo. Furthermore, the coarsening of reinforcing particles that solidify at temperatures above the melting point of titanium is also mitigated by solid state processing.

Thus in a first aspect, the present invention relates to a method for producing a weldable wire of alloyed titanium, wherein the method comprises the following successive process steps:

a) forming a green object by;
  blending particulates of titanium sponge with a particle diameter in the range from 0.5 to 10 mm with one or more powdered alloying additions with particle size in the range from 50-250 µm,
  cold compacting the blended mixture and subjecting the blended mixture including lubricant to a pressure in the range from 750 to 1250 MPa, b) forming an elongated profile of alloyed titanium by;
  heating the green object in a protected atmosphere up to a temperature in the range from 1000 to 1250° C. and holding the temperature for a period of at least 4 hours, and then
  hot working the green object at a temperature of less than 200° C. apart from the beta transition temperature of the titanium alloy and shaping the green object to obtain an elongated profile of alloyed titanium, and c) forming the welding wire of alloyed titanium by:
  rolling the elongated profile of alloyed titanium in a rolling mill with one or more rolls placed in series to form the weldable wire with the desired diameter.

The method according to the invention provides a cost effective method for producing weldable wires of alloyed titanium from commercially available titanium sponge, i.e. Kroll titanium sponge, and alloying additions and/or reinforcing particles, to produce titanium alloy and/or titanium composite wire feedstock in a manner requiring substantially fewer processing steps and giving greater flexibility in final wire composition. Furthermore, the current invention produces a weldable wire that, when melted and built into a component using additive manufacturing, exhibits a chemical composition and mechanical properties comparable to the chemical composition and mechanical properties demonstrated in components built up using conventional welding wire.

The invention may employ any known titanium sponge, and the particles of titanium sponge may advantageously be made by crushing and shearing of larger pieces of titanium sponge. The particles may have particle sizes in any range beginning with one of 0.5, 1, 1.5, or 2 mm and ending with one of 2.5, 3, 3.5 4, 4.5, 5, 6, 7, 8, 9, or 10 mm. Examples of suitable ranges are particle size fractions between 0.5-10 mm, 0.5-8 mm, between 1-6 mm, and between 1-4 mm. The term "particle size fraction" of a specified range as used herein is related to the size of the mesh holes in a grate being used to classify the particles, such that the particle size fraction with range of i.e. 0.5 to 10 mm is to be understood as particles with sizes large enough to not pass through a grate with mesh hole size 0.5 mm but small enough to pass through a grate with mesh hole size of 10 mm.

Figure 1A:
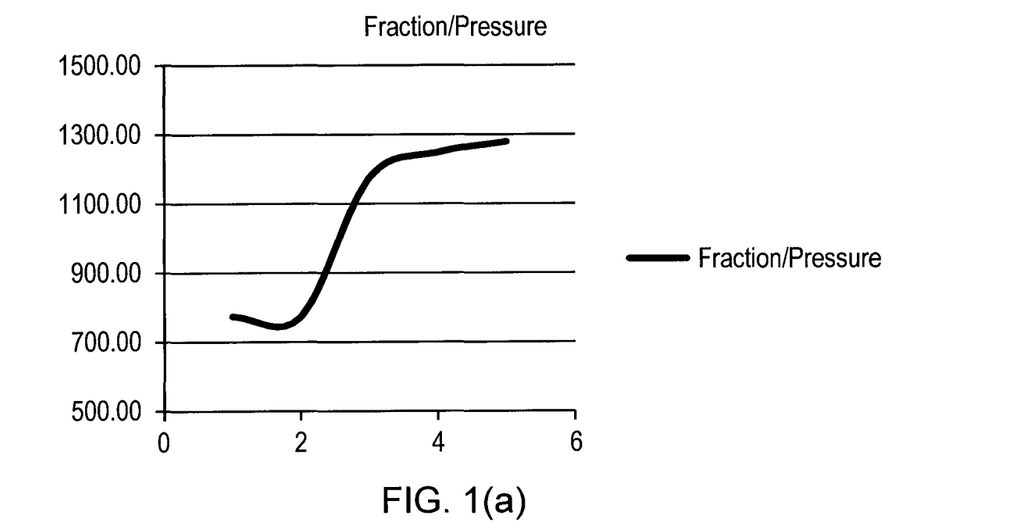
FIGS. 1a) and b), where a) is a graph showing the applied pressing pressures as a function of particulate size fractions, and b) is a graph showing obtained density of the compact as a function of particulate size fractions.
Figure 1B:
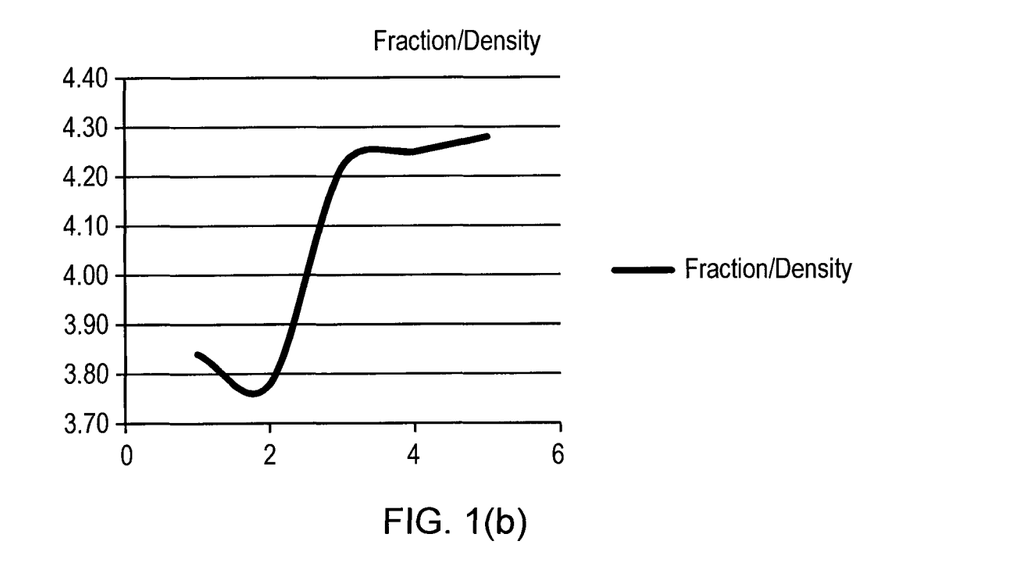

The use of relatively coarse particles of commercially available titanium sponge provides an advantage in saving a significant amount of work and energy in forming the titanium particles as compared to prior art employing powdered titanium. Thus from a cost perspective, it should be employed as large particulates as possible. However, from a compaction point of view it is advantageous to employ as fine particles as possible. It is thus performed experiments with compaction of titanium sponge particulates to investigate the largest possible particulate sizes which may be used. The test results is shown in FIG. 1a) and b), where a) is a graph showing the applied pressing pressures as a function of particulate size fractions, and b) is a graph showing obtained density of the compact as a function of particulate size fractions. Note the surprising result that the obtained densities become lower with smaller particle sizes. The results indicate that the applied pressure should be at least 750 MPa, but may advantageously be in the range from 1100 to 1200 MPa. The applied pressure should advantageously be sufficiently high to achieve a billet with at least 80% of theoretical maximum density.

One example of a suited sponge is magnesium-reduced, vacuum distilled titanium sponge satisfying the ASTM B299-07 specification [1]. This sponge has the advantage of having high commercial availability and low residual impurities levels. The inventive method may, with commercial available titanium sponge of this quality, obtain titanium wires containing less than 2000 ppm oxygen, 300 ppm N, 500 ppm C and 150 ppm H. However, these limits indicate what may be achieved using the present invention, and do not exclude the production of wires with higher contents of impurities through intentional additions. The lower limit of the titanium sponge particles is dictated by the Fe, O and N impurities that arise from retort contamination and atmospheric contamination during the Kroll process. For this reason, sponge particles smaller than 2-3 mm are often used as an alloying additions in the production of other metals, however, particles less than 3 mm may be used provided that the overall content of impurities imparted by these sub-3 mm particles does not exceed the relevant specification [2]. This may be achieved by diluting the as-received sponge particles that are less than 3 mm with larger sponge particles that have been crushed and ground to a smaller size.

The invention may apply any known or conceivable alloying additive able to form an alloy with titanium. The alloying additive should preferably be a powder with mean particle size in the range from 50 to 250 µm in order to facilitate the in-diffusion and solving of the alloying elements in the titanium phase during sintering and thus to form a titanium alloy with a substantially homogeneous composition.

The weight ratio of titanium particulates versus alloying powder additives of the blended mixture which is to be cold compacted to billets is to be determined according to the intended composition of the titanium alloy that is to be produced. The invention is not tied to any specific range of weight ratios, but may apply any weight ratio titanium particulates: alloying additives necessary to form the intended alloy composition. One example of a suitable alloying addition is 60Al-40V masteralloy granules, which may be blended with titanium sponge in a 1:9 ratio to produce Ti-6Al-4V alloy, which is a standard grade of titanium denoted as ERTi-5 (welding wire for ASTM Grade 5) [2]. An alternate source of alloying additions may be 35Al-65V masteralloy, which may be blended together with pure aluminium particles and titanium sponge in a ratio of 9.23:0.77:90 to produce the same Ti-6Al-4V alloy. The proportion of alloying additions added to titanium sponge is given from rules of mixtures and the standard specification for the target titanium alloy. Reinforcing particles may consist of refractory ceramics that do not completely dissolve in titanium at temperatures less than 1200° C. Examples of such particles include $TiB_2$, $Y_2O_3$ and other oxides of reactive and rare earth elements.

One advantage of the present invention is that it allows forming homogenous titanium alloys from relatively coarse particulates of crushed titanium sponge which are processed solely in the solid state without melting the titanium at any time during processing. One of the vital features allowing this advantage is the cold compacting of the blended mixture of titanium sponge particulates, alloying powder additions, and optionally other additives such as reinforcing particulates, lubricants etc. to be pressed, without any additional processing or treatments such as spherodizing or cleaning, to form a billet up to a density in the range from about 80 to about 90% of theoretical maximum density of the titanium alloy. One expected problem with cold compacting coarse particulates of titanium with arbitrary shapes and sharp edges is galling or other form of tearing damages on the pressing tools. A solution to this problem is to employ uniaxial presses operating with the floating die principle where the stress ring is allowed to float along with the press ram. An example of a suitable compaction tool is the stripwinding tool of Strecon in Denmark which employs a pre-stressed stress ring made up of multiple layers of a high-strength steel strip material which is wound around a core of hardened tool steel or tungsten carbide. This tool has the advantage of behaving fully elastic even under very high loads, and is thus able to withstand the high shear forces under compaction of coarse particles of titanium. A surprising discovery made by the applicant is that the problem with galling becomes worse when the average particle size of the titanium particulates becomes smaller than 1 mm, such that a practical lower limit of the mean particle size of the titanium particulates becomes 0.5 mm. By the term "cold compaction" as used herein, means that the temperature of the particulates of crushed titanium sponge is below 200° C. when being subject to the pressing forces. The cold pressing may be performed at room temperature.

The problem with galling may be alleviated by coating a lubricant onto the wall of the press ring before compaction of the blended mixture. The lubricant may also be added and mixed into the blended mixture to increase the lubrication effect. The lubricant should be driven off the pressed billet after compaction in order to avoid pollution of the titanium alloy during the sintering. This may be obtained by subjecting the billet to a moderate heat treatment up to a temperature of about 400° C. The present invention may apply any known or conceivable lubricant employed in powder metallurgical compaction which may be driven off the compact at temperatures below 400° C., since this is the maximum temperature at which titanium is resistant towards oxygen in the ambient air. Thus, the driving off of the lubricant should thus be obtained by a relatively moderate heating to a temperature range from about 200 to 400° C., and hold the billet at this temperature until the lubricant has stopped gassing off, typically giving a holding period from 0.5 to 10 hours. If the lubricant is mixed into the blended mixture of particulates and powder, it will reduce internal friction between the particles during compacting and thus alleviate the compacting process up to a point where the lubricant becomes a steric hindrance for further compaction. Another function of the lubricant is to reduce external friction which is friction between the compact and die wall. External friction is a source of galling and wear of the pressing tools, and is especially a problem during compaction of particulate titanium sponge due to the hardness of the titanium particulates. Lubricants for powder metallurgical compaction are commercially available as three types; metal stearates, amide waxes, and composite lubricants. Examples of suitable lubricants includes, but is not limited to; zinc stearate, N,N' ethylene bisstearamide.

The mixture of titanium sponge particles, alloying additions, and optionally other additive particles such as i.e. lubricant are poured into the chamber of the press tool with the bottom of the chamber sealed to prevent the particles from falling through the press. Filling of the chamber of the compaction tool is conducted in the presence of an ambient atmosphere as the use of inert, non-oxidizing purging gas(es) during cold compaction will lead to entrainment of the inert gas in the compacted billet. The encapsulated inert gas results in final product porosity, as these gases exhibit zero or negligible solubility in titanium. No encapsulation of the titanium sponge billet is necessary as the starting constituents are of low magnesium, magnesium chloride and oxygen levels and compaction occurs at low temperatures, such as i.e. room temperature. Thus expensive canning and degassing operations are eliminated and the compacted billet can be handled in an identical manner to conventional titanium produced from the thermo-mechanical processing of conventionally cast ingots. The press ram is slowly lowered to allow air to escape from the porous billet as it is slowly compacted and densified. A titanium sponge billet of high density and negligible open, surface-breaking porosity may be produced in this manner. Higher densities are desirable as there are fewer internal voids and surface defects, although the press capacity and friction between the titanium sponge and press container wall(s) limits the extent to which full densification can be achieved. The compacted billet (hereafter referred to as "billet") is then ejected from the press. The invention is not tied to this specific example of cold compaction, the invention may employ any known or conceivable process for cold compaction of a blended mixture of titanium sponge and alloying additions and/or reinforcing particles into a billet of high density and negligible open surface-breaking porosity.

After compacting of the blended mixture to form a billet, the alloying elements should be solved into the titanium phase by in-diffusion. This is obtained by heating the billet in an inert atmosphere up to a temperature near the beta transition temperature for the titanium billet, since the diffusion of alloying additions and atmospheric impurities are increased by nearly an order of magnitude in the higher temperature beta phase, relative to the lower temperature, alpha allotrope. This is due to the lower packing fraction of the body-centred cubic beta phase, versus the hexagonal close-packed alpha phase. In practice, this means that the temperature during in-diffusion of the alloying elements should be in the range from 1000 to 1250° C. and holding the billet at this temperature for a sufficient period to solve the alloying additions, which in practice means 4 hours or more. When applying alloying additives with average particle sizes below 250 μm and applying a temperature of 1100° C., practical tests show that the alloying elements will be completely solved into the titanium with a holding time of 6 to 8 hours. Heating of the compacted billet in an inert (protected) atmosphere is necessary to minimise atmospheric contamination, but may be omitted if appropriate glass coatings or other protective coatings are applied. The term "protected atmosphere" as used herein means any known or conceivable gas or gaseous mixture covering an object of heated metal and which isolates the metal object from ambient air and thus protects the metal from being subject to oxidation or eventual other unwanted chemical action from constituents of the atmosphere.

The welding wire should have as homogeneous composition as possible in order to obtain properties comparable with conventional welding wires. Also, an alloyed bolt of substantially uniform chemical composition and microstructure characterised as having a uniform distribution of reinforcing fine particles and an absence of discrete alloying addition or master-alloy particles is advantageous for subsequent extrusion and rolling. The diffusion distance at which alloying elements Al and V will penetrate into the titanium phase may be calculated from given temperatures and holding times by employing equations 1-3:

$$D_V^\beta = 10^5 \exp(-17460/T(K)) \ (\mu m^2/s) \quad (1)$$

$$D_{Al}^\beta = 1.2 \times 10^5 \exp(-18040/T(K)) \ (\mu m^2/s) \quad (2)$$

$$P = \sqrt{6Dt} \quad (3)$$

From Table 1 it is seen that heat treatment may be employed for homogenisation of the composition, but at an unsatisfactory high temperature and holding time. It is thus advantageous to include a hot working step after heat treatment in order to complete the homogenisation of the titanium alloy. The hot working step has the function of kneading the titanium phase in order to homogenise the composition and to remove eventual remaining pores or cavities in the billet after compaction. Any known or conceivable hot working technique able to obtain this objective may be applied. An example of a suited hot working is extruding the billet into an elongated work body or rod suitable for subsequent rolling and drawing to form a thin homogeneous wire suitable for use as a welding wire in direct metal deposition construction of objects.

In case of employing extrusion as the hot working, the billet may advantageously be coated or encapsulated with a lubricant before extruding to reduce friction between the billet and extrusion press surfaces, thus lowering the forces required to perform extrusion. Any presently or future lubricant known to the skilled person to be suited for extruding titanium billets may be applied. One example of a suitable lubricant is glass. The hot extrusion of the compacted titanium billet may be performed in the following manner. The billet may advantageously be coated with a glass lubricant to mitigate friction between the billet and press surfaces, minimise wear of the extrusion die and uptake of atmospheric contaminants. The billet is heated, preferably in an inert or vacuum atmosphere, such that the entrapped oxygen and nitrogen originating from the cold compaction process are absorbed into the titanium matrix, while the alloying additions have sufficient time at temperature to completely dissolve. This leads to the closing and fusion of internal porosity and homogenisation of the billet composition. At the completion of this heating step,

TABLE 1

Calculated Al and V diffusion distances (in micrometers) for dissolution of alloying additions during homogenisation at various temperatures and durations.

| | | Aluminium | | | | | Vanadium | | | | |
|---|---|---|---|---|---|---|---|---|---|---|---|
| T (° C.) | T (K) | $D_{Al}$ (μm²/s) | 10800 s | 18000 s | 36000 s | 72000 s | $D_V$ (μm²/s) | 10800 s | 18000 s | 36000 s | 72000 s |
| 900 | 1173 | 0.025 | 40.3 | 52.1 | 73.7 | 104 | 0.034 | 47.2 | 60.9 | 86.1 | 122 |
| 1000 | 1273 | 0.084 | 73.8 | 95.3 | 135 | 191 | 0.111 | 84.6 | 109 | 154 | 218 |
| 1100 | 1373 | 0.236 | 124 | 160 | 226 | 319 | 0.300 | 139 | 180 | 255 | 360 |
| 1200 | 1473 | 0.576 | 193 | 249 | 353 | 499 | 0.711 | 215 | 277 | 392 | 554 |
| 1300 | 1573 | 1.254 | 285 | 368 | 521 | 736 | 1.512 | 313 | 404 | 571 | 808 |
| 1400 | 1673 | 2.490 | 402 | 519 | 733 | 1037 | 2.935 | 436 | 563 | 796 | 1126 | blended mixtures of alloying additions and titanium sponge exhibit a continuous phase.

Starting mixtures containing reinforcing particles retain a two-phase microstructure, as the reinforcing particles should not dissolve completely within the titanium matrix. One such example is TiB$_2$, which will react with the titanium matrix under the heating described above to form TiB according to reaction 4. The reinforcing particles are partly dissolved, but the remaining TiB is stable and forms the secondary phase. An alternate embodiment is the use of Y$_2$O$_3$ reinforcing particles, which are thermodynamically stable in that there is no reaction with the titanium matrix, thus the Y$_2$O$_3$ reinforcing particles do not dissolve.

$$\text{TiB}_{2(added\ particles)} + \text{Ti}_{(matrix)} \rightarrow 2\text{TiB}_{(reinforcing\ particles)} \quad (4)$$

Advantageously, the density of the compacted billet relative to the starting sponge particles should be as close to the theoretical bulk density of the mixture, as this presents a significant diffusion barrier to the mass transport of gaseous impurities. Typically, significant amounts of open and interconnected porosity are observed when the billet density drops below 90%. In practice, this implies that the neither the starting temperature nor the exit temperature of the billet during extrusion should exceed 1300° C. The density of the extruded bar may be greater than 98%.

The billet may advantageously be transferred without delay to a preheated extrusion press chamber. Heating of the extrusion chamber and die is necessary to prevent rapid chilling of the titanium billet, which would lead to unnecessarily high extrusion pressures. The extrusion ram applies increasing force to the back end of the billet, leading to near-complete densification. With increasing pressure, the billet begins to flow through the extrusion die forming an extruded form such as bar or profile. The speed of the emerging extrusion form is proportional to the relative cross sectional areas of the billet and bar, also known as the extrusion ratio, and the extrusion press speed. The extrusion die must also have the correct inlet and outlet geometries to ensure the surface finish of the extruded titanium is free of defects. The extruded titanium, or work body, may advantageously be cleaned of surface contaminants and coiled whilst warm to facilitate subsequent handling and storage.

The finalisation of the welding wire is cold forming the hot forged elongated work body to the wire. This is obtained by a combination of successive rolling steps in a rolling mill for reduction of diameter of the work body. Each pass through the rolls should advantageously impart an area reduction of 5-35%. The rolling process is repeated until the work body is transformed to the desired diameter of the welding wire, typically in the range from 0.8 to 3 mm. The work body may advantageously be annealed at a temperature from about 400 to about 600° C. for a period of from about 10 to 60 minutes between each rolling step in order to relieve stress. Alternatively, the rolling process may be performed in a continuous rolling mill with several rolls positioned in series such that the incoming feed is continuously and significantly the reduced in cross-sectional area. In this alternative, intermediate stress relief may be obtained by holding the wire in a heated furnace, preferably filled with inert gas or vacuum. Stress relief may be performed either in batches or in-line between rolling passes, and should provide conditions that promote sufficient re-crystallization, and subsequent softening, to occur, such that the resultant rod or wire regains sufficient ductility to be further cold-worked. It is desirable that there is at least one rolling pass after the stress relief heat treatment, but prior to coiling the wire, in order to obtain sufficient stiffness in the wire product that it may be fed through commercial automatic welding wire feeders. The cross-section profile of the wire is determined by the size and shape of the grooves in the rolling mill and may vary during the course of rolling, for instance a four-, six- or eight-sided rod may be passed through rolls with a semi-circle to produce a circular wire, and vice versa.

Alternatively, the rolling of the work body may be stopped when obtaining a relatively thick wire with a diameter in the range of 1 to 4 mm and then reduce the wire's diameter to the intended size by one or more drawing steps. Stress relieve may advantageously be performed by annealing at a temperature of 400 to 600° C. for a period from 10 to 60 minutes between each successive drawing. Any known or conceivable drawing technology able to make a titanium alloy wire with an even diameter in the range of 0.8 to 3 mm from an elongated work body of 1 to 4 mm diameter may be applied. Other diameters may also be applied, both for the final diameter of the welding wire and the diameter of the drawing wire. The specifications above are to be interpreted as suitable ranges and not as absolute limits.

VERIFICATION OF THE INVENTION

A series of 18 cylindrical billets with diameter 80 mm were made as follows: Crushed titanium sponge with particle sizes from 0.5 to 8 mm, with the main fraction of 1 to 4 mm was mixed with 10 weight % (based on weight of titanium sponge) of master-alloy 433-6 with average particle size fraction from 100 to 250 μm and 0.8 weight % (based on total amount of the mixture) of a commercial composite lubricant sold under the trademark Metallub from Höganes AB of Sweden. The mixture was blended in a cement mixer until substantially homogeneous composition.

Each billet was then made by compacting an amount of the powder by loading it stepwise into the chamber of a uniaxial press with a floating die and subject the powder to a stepwise pressure increase. Typical pressing procedure was; initially loading about ¼ of the mixture into the press chamber and applying a pressure of about 20 MPa. Then add another ¼ of the mixture into the press chamber and applying a pressure of about 40 MPa. Add another small fraction of the mixture and increase the pressure to 90 MPa, before loading another 1/4 of the mixture and increase the pressure to 155 MPa, before adding the remaining mixture and increase the pressure to about 770-780 MPa. This resulted in billets with a density in the range from 80 to 90% of maximum theoretical density, as given in Table 2:

10 of these billets were heated up to 400° C. for one hour and then held at 200° C. for 12 hours to drive out the lubricant. The lubricant was a commercial composite lubricant sold under the trademark Metallub® and comprises a zinc soap and an amide component. Then the billets were loaded into a retort furnace and heated to 1100° C. for 8 hours in an argon atmosphere.

Figure 2:
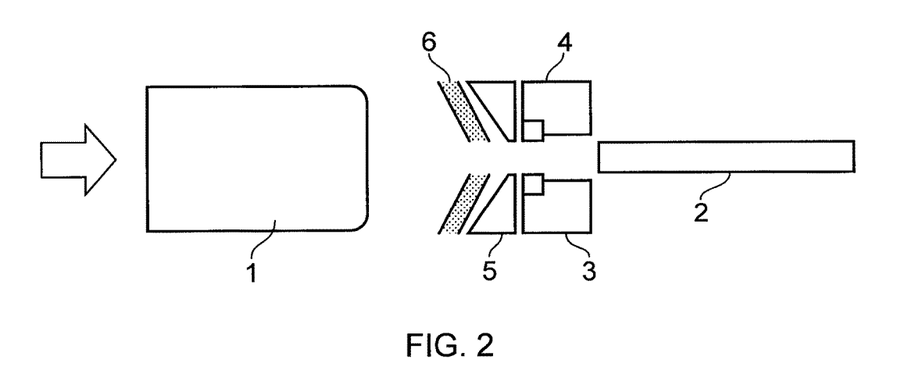
FIG. 2 is a schematic drawing of a cross-section of an extruder for hot working the billet.

The bolts were then hot extruded to form hot forged work bodies. The billets were coated in glass and pressed through die to form extruded rods of titanium. A schematic drawing showing a cross-section of the extruder is shown in FIG. 2. The billet 1 is moved in the direction indicated by the arrow and pressed towards a die. The die comprises a die support 3 made of high strength steel and a ceramic ring 4. Before the die there is a conical support ring 5 of high strength steel creating

TABLE 2

Results of compacting 1-8 mm particulates to 80 mmØ billets

| Amount blended mixture [g] | Maximum applied pressure [MPa] | Height billet [mm] | Obtained density [g/cm³] | Percentage of maximum theoretical density |
|---|---|---|---|---|
| 2875.0 | 774.0 | 141.1 | 4.02 | 89.2 |
| 3350.0 | 773.8 | 170.2 | 3.88 | 86.1 |
| 3375.0 | 773.2 | 170.0 | 3.91 | 86.8 |
| 3580.0 | 773.2 | 184.5 | 3.83 | 84.8 |
| 3495.0 | 774.2 | 176.6 | 3.91 | 86.6 |
| 3295.0 | 772.8 | 180.3 | 3.60 | 79.9 |
| 3520.0 | 773.2 | 179.7 | 3.86 | 85.6 |
| 3780.0 | 774.2 | 203.0 | 3.68 | 81.5 |
| 3355.0 | 772.8 | 170.2 | 3.89 | 86.2 |
| 3580.0 | 773.0 | 185.0 | 3.81 | 84.6 |
| 3405.0 | 773.0 | 171.6 | 3.91 | 86.7 |
| 3480.0 | 773.0 | 177.2 | 3.87 | 85.9 |
| 3225.0 | 774.4 | 162.2 | 3.93 | 87.1 |
| 3525.0 | 774.0 | 179.1 | 3.88 | 86.1 |
| 2515.0 | 774.7 | 132.6 | 3.75 | 83.1 |
| 3300.0 | 772.2 | 170.3 | 3.85 | 85.4 |
| 4205.0 | 776.1 | 224.7 | 3.70 | 82.1 |
| 3015.0 | 773.4 | 157.2 | 3.78 | 83.9 | a funnel resembling entrance into the die ring. A conical ring made of glass 6 is placed into the support ring 5 to provide lubrication during the extruding of the billet. The parameters employed in the extrusion of the billets are given in Table 3.

One extruded rod (work body) with diameter of 20 mm was subject to several rolling steps to form a welding wire of diameter 1.6 mm. Each rolling step was performed as follows; the work body was stress relieved by heating it to 600° C. and kept at that temperature for 15 minutes, and then passed through a rolling step which decreased the diameter a certain degree. Then the procedure was repeated until the intended diameter of 1.6 mm was obtained. The stepwise decrease in the diameter of the work body was; 18, 12, 8, 6, 4, 3, 2, and 1.6 mm.

The welding wire was employed in a TIG welding torch for building a test object by direct metal depositing four welds onto each other and creating two small objects of

TABLE 3

Parameters employed in hot extrusion of billets

Figure 3:
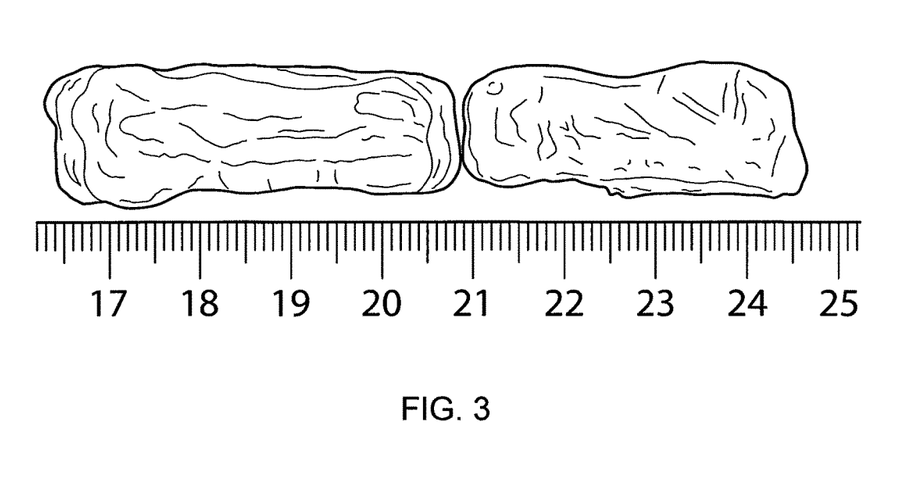
FIG. 3 is a photograph of two objects in alloyed titanium made from DMD-construction with a welding wire made according to the invention.

| Temperature [° C.] | Diameter extrudate [mmØ] | Velocity extruder piston [mm/s] |
|---|---|---|
| 1000 | 20 | 12 |
| 1000 | 26 | 12 |
| 1000 | 10.5 | 12 |
| 900 | 16 | 12 |
| 900 | 16 | 12 |
| 850 | 16 | 12 |
| 880 | 16 | 12 |
| 880 | 16 | 12 |
| 890 | 20 | 12 |
| 890 | 20 | 12 | approx. 25 g. The welding was a conventional DMD-process in an argon atmosphere where the TIG-torch was supplied with 70 A at 11 V and an argon flushing of 14 liters argon per minute (room temperature and 1 atmosphere). A photograph of the objects is shown in FIG. 3.

The samples were analysed in a scanning electron microscope with X-ray micro-analysis (SEM/EDS) and compared to a Grade 5 reference material 295-335-HV10. It was found that the titanium alloy of the two objects had an aluminium content of 1.1-2.0 weight % and vanadium content of 1.1-2.1 weight %. These values are about a factor 2 lower than standard grade 5 material which has an Al content of 5.1-5.4 weight % and V content of 4.5-5.1 weight %. The discrepancy is believed to be due to incomplete homogenisation or a segregation of titanium sponge particulates and alloy powder addition in the blended mixture.

However, the SEM/EDS analysis did find that there were no pure master-alloy phases in the welded titanium object and that the alloying elements Al and V were homogeneously distributed in the titanium matrix, showing that a complete dissolution and homogenisation has been obtained. The hardness of the titanium alloy was found to be similar to the hardness of the reference material.

REFERENCES

1. ASTM standard B299-07, "Standard Specification for Titanium Sponge", ASTM International, West Conshohocken, Pa., 2007, DOI: 10.1520/B0299-07.
2. AWS standard A5.16/A5.16M:2007, "Specification for Titanium and Titanium-Alloy Welding Electrodes and Rods", Americal Welding Society, Miami, Fla., 2007.
3. ASTM standard B381-06a, 2006, "Standard Specification for Titanium and Titanium Alloy Forgings", ASTM International, West Conshohocken, Pa., 2006.

The invention claimed is:

1. A method for producing a weldable wire of alloyed titanium, wherein the method comprises the following successive process steps:
    a) forming a green object by:
        blending particulates of titanium sponge with a particle diameter in the range from 0.5 to 10 mm with one or more powdered alloying additions with particle size in the range from 50-250 µm; and
        cold compacting the blended mixture and subjecting the blended mixture including lubricant to a pressure in the range from 750 to 1250 MPa;
    b) forming an elongated profile of alloyed titanium by:
        heating the green object in a protected atmosphere up to a temperature in the range from 1000 to 1250° C. and holding the temperature for a period of at least 4 hours; and then
        hot working the green object at a temperature of less than 200° C. apart from the beta transition temperature of the titanium alloy and shaping the green object to obtain an elongated profile of alloyed titanium;
    c) forming the welding wire of alloyed titanium by:
        rolling the elongated profile of alloyed titanium in a rolling mill with one or more rolls placed in series to form the weldable wire with the desired diameter.

2. A method according to claim 1, wherein the particles of titanium sponge are crushed and sheared titanium sponge of magnesium reduced, vacuum distilled titanium sponge satisfying the ASTM standard B299-07.

3. A method according to claim 2, wherein the crushed and sheared titanium sponge has a particle size fraction in one of the following ranges: from 0.5 to 8 mm, from 1 to 6 mm, or from 1 to 4 mm.

4. A method according to claim 1, wherein the compacting of the blended mixture is performed at room temperature with a compacting pressure in the range from 1100 to 1200 MPa.

5. A method according to claim 1, wherein compaction is performed in an uniaxial press which comprises a floating stress ring and a floating press ram, wherein walls of the press ring is coated with a lubricant selected from a metal stearates or an amide wax.

6. A method according to claim 5, wherein
the lubricant is also blended into the mixture and the green object is subsequent to compaction heated to a temperature in the range from 200-400° C. and held at this temperature for a period of 0.5 to 10 hours.

7. A method according to claim 5, wherein the lubricant is zinc stearate or N,N' ethylene bisstearamide.

8. A method according to claim 1, wherein step b) of forming the elongated profile of alloyed titanium is obtained by:
heating the green object in a protected atmosphere up to a temperature of approximately 1100° C. and holding the temperature for a period of 6-8 hours; and then
hot extruding the green object at a temperature of less than 200° C. from the beta transition temperature of the titanium alloy.

9. A method according to claim 1, wherein
step b) of forming the elongated profile of alloyed titanium is obtained by:
heating the green object in a protected atmosphere up to a temperature of approximately 1100° C. and holding the temperature for a period of 6-8 hours; and then
hot extruding the green object at a temperature of less than 200° C. from the beta transition temperature of the titanium alloy; and
step c) of forming the welding wire is obtained by:
shaping the elongated profile of alloyed titanium to a drawing wire by:
i) annealing the elongated profile at about 400-600° C. for a period from 10 to 60 minutes;
ii) rolling the elongated profile to reduce its diameter in a rolling mill; and
iii) repeating steps i) and ii) until the diameter of the elongated profile becomes in the range from 1 to 4 mm;
and then
shaping the drawing wire to the welding wire by:
j) annealing the drawing wires at about 400-600° C. for about 10-60 minutes;
jj) drawing the drawing wire to reduce its diameter in a per se known manner; and
jjj) repeating steps j) and jj) until the wire obtains the intended diameter of the welding wire.

10. A method according to claim 9, wherein each pass through the rolls of the rolling mill reduces the diameter of the elongated profile from 5 to 35%.

* * * * *